United States Patent
Tsai

(10) Patent No.: US 9,696,224 B1
(45) Date of Patent: Jul. 4, 2017

(54) TORQUE DETECTION DEVICE

(71) Applicant: Chung-Yu Tsai, Taichung (TW)

(72) Inventor: Chung-Yu Tsai, Taichung (TW)

( * ) Notice: Subject to any disclaimer, the term of this patent is extended or adjusted under 35 U.S.C. 154(b) by 0 days.

(21) Appl. No.: 14/985,467

(22) Filed: Dec. 31, 2015

(51) Int. Cl.
*G01L 3/00* (2006.01)

(52) U.S. Cl.
CPC .................... *G01L 3/00* (2013.01)

(58) Field of Classification Search
CPC . G01L 5/0042; G01L 5/03; G01L 5/24; B25B 23/14; G01M 5/0058
USPC ............................................ 73/862.21, 761
See application file for complete search history.

(56) References Cited

U.S. PATENT DOCUMENTS

| | | | | |
|---|---|---|---|---|
| 4,866,990 A * | 9/1989 | Peterson | ............... | G01M 99/00 73/761 |
| 5,152,182 A * | 10/1992 | Searle | ............... | G01L 5/0042 73/862.21 |
| 5,197,339 A * | 3/1993 | Dutkiewicz | ......... | G01M 13/027 73/862.08 |
| 5,615,575 A * | 4/1997 | Goodwin | ............... | B23P 19/06 411/14 |
| 7,252,013 B2 * | 8/2007 | Hammond, Jr. | ......... | G01N 3/22 73/856 |
| 7,275,450 B2 * | 10/2007 | Hirai | ............... | B25B 21/00 73/862.21 |
| 7,454,980 B2 * | 11/2008 | Tan | ............... | G01N 3/22 73/814 |
| 7,594,446 B2 * | 9/2009 | Schwafertz | ............... | G01L 25/003 73/862.325 |
| 7,730,791 B2 * | 6/2010 | Tan | ............... | G01N 3/22 73/761 |
| 8,316,720 B2 * | 11/2012 | Huang | ............... | G01L 5/0042 73/847 |
| 8,453,519 B2 * | 6/2013 | Zhang | ............... | G01L 5/0042 73/862.08 |
| 8,511,181 B2 * | 8/2013 | Duffin | ............... | G01L 3/1457 73/862.22 |
| 8,806,961 B1 * | 8/2014 | Reilly | ............... | G01L 25/003 73/862.21 |
| 8,984,965 B2 * | 3/2015 | Matsumoto | ......... | G01M 13/025 73/862.195 |
| 9,410,859 B2 * | 8/2016 | Hsieh | ............... | G01L 5/24 |
| 9,410,863 B2 * | 8/2016 | Nichols | ............... | G01L 25/003 |
| 2010/0270721 A1 * | 10/2010 | Liu | ............... | G01L 25/003 269/57 |
| 2015/0114138 A1 * | 4/2015 | Fujimoto | ............... | B25B 23/147 73/862.23 |

* cited by examiner

Primary Examiner — Lisa Caputo
Assistant Examiner — Tran M Tran

(57) ABSTRACT

A torque detection device includes a base with a first support portion and a second support portion, two first rails connected to the first support portion and two second rails movably connected to the two first rails. A movable part is connected to the two second rails and has two rods. A chuck unit is connected to the movable part. A torque device is connected to the first support portion and has a receiving member. A first part has a first engaging portion on the first end thereof, and which is engaged with the receiving member. The first part has a second engaging portion on the other end thereof. An axial force detector is connected to the second support portion and has a reception member, and the two rods contact the reception member. The axial force detector detects the axial force that the two rods apply to the movable part.

14 Claims, 12 Drawing Sheets

A-A

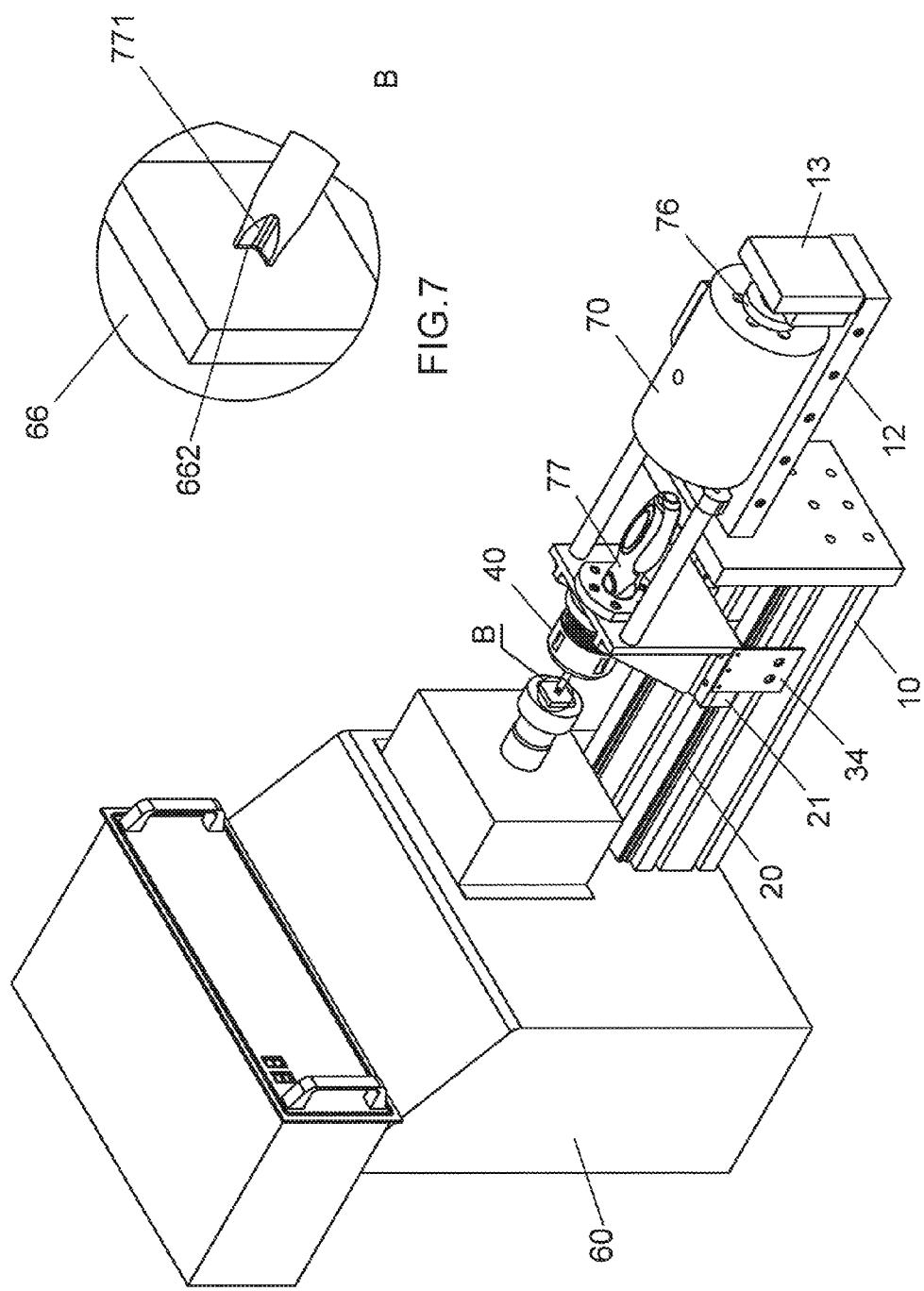

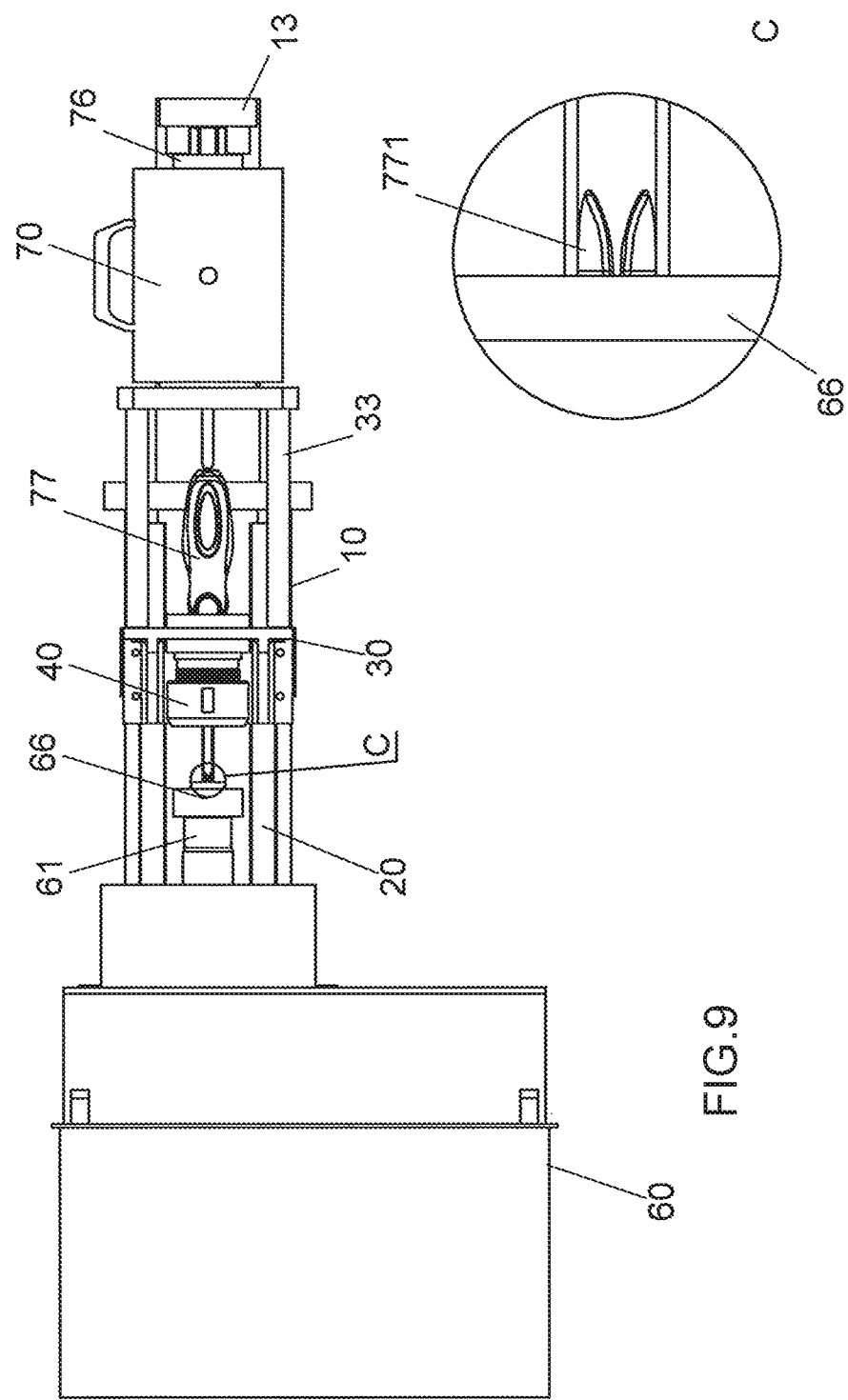

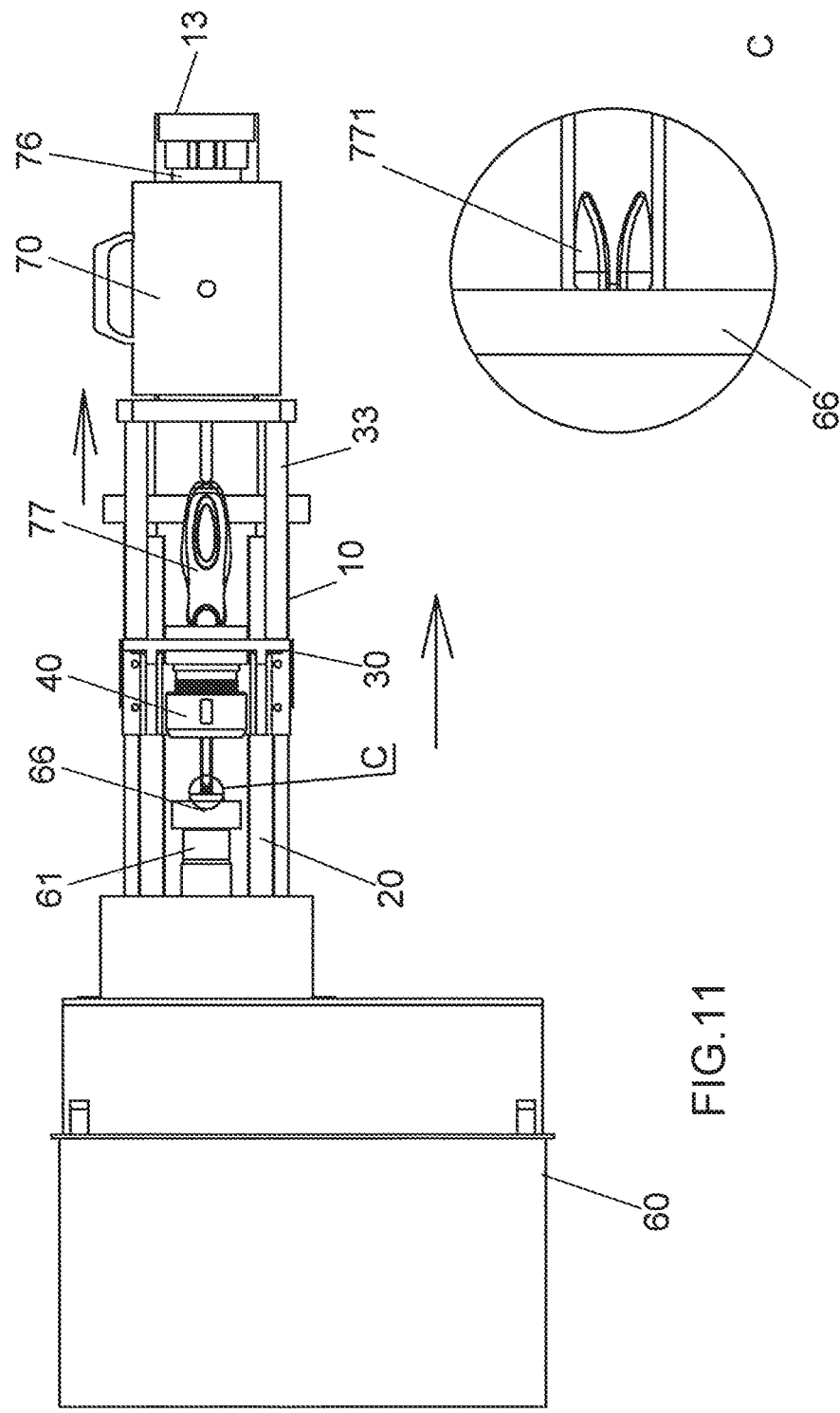

TORQUE DETECTION DEVICE

BACKGROUND OF THE INVENTION

1. Fields of the Invention

The present invention relates to a torque detection device, and more particularly, to a torque detection device for detection of torque and axial force of hand tools.

2. Descriptions of Related Art

The conventional torque detection device for detection of the torque of a pneumatic tool generally comprises a base, a torque shaft, a sleeve, a detection unit, a digits display unit and a pattern display unit, wherein the base has a first support portion and a second support portion. The torque shaft has a fixing portion and a connection portion, wherein the fixing portion is connected to a first support portion. The connection portion is pivotably connected to a second support portion. The sleeve is mounted to the connection portion and has a reception hole into which the pneumatic tool is inserted. The detection unit is connected to the torque shaft to detect the torque of the torque shaft so as to output a signal of deformation which is transferred into digits and patterns. Nevertheless, the torque detection device has a single function which is the detection of the torque of a tool, and more specifically, only the tools with a rectangular driving head can be detected.

The present invention intends to provide a torque detection device to eliminate the shortcomings mentioned above.

SUMMARY OF THE INVENTION

The present invention relates to a torque detection device which comprises a base with a first support portion and a second support portion. Two first rails are connected to the first support portion and two second rails are movably connected to the two first rails. A movable part is connected to the two second rails and has two rods. A chuck unit is connected to the movable part. A torque device is connected to the first support portion and has a receiving member. A first part has a first engaging portion on the first end thereof, and which is engaged with the receiving member. The first part has a second engaging portion on the other end thereof. An axial force detector is connected to the second support portion and has a reception member, and the two rods contact the reception member. The axial force detector detects the axial force that the two rods apply to the movable part.

The present invention will become more obvious from the following description when taken in connection with the accompanying drawings which show, for purposes of illustration only, a preferred embodiment in accordance with the present invention.

BRIEF DESCRIPTION OF THE DRAWINGS

FIG. 6 is a perspective view to show the torque detection device of the present invention;

FIG. 7 is an enlarged view of the portion designated by "B" in FIG. 6;

FIG. 9 is a top view of the torque detection device of the present invention;

FIG. 10 is an enlarged view of the portion designated by "C" in FIG. 9;

FIG. 11 is a top view to show the operational status of the torque detection device of the present invention;

FIG. 12 is an enlarged view of the portion designated by "C" in FIG. 11;

DETAILED DESCRIPTION OF THE PREFERRED EMBODIMENT

Figure 1:
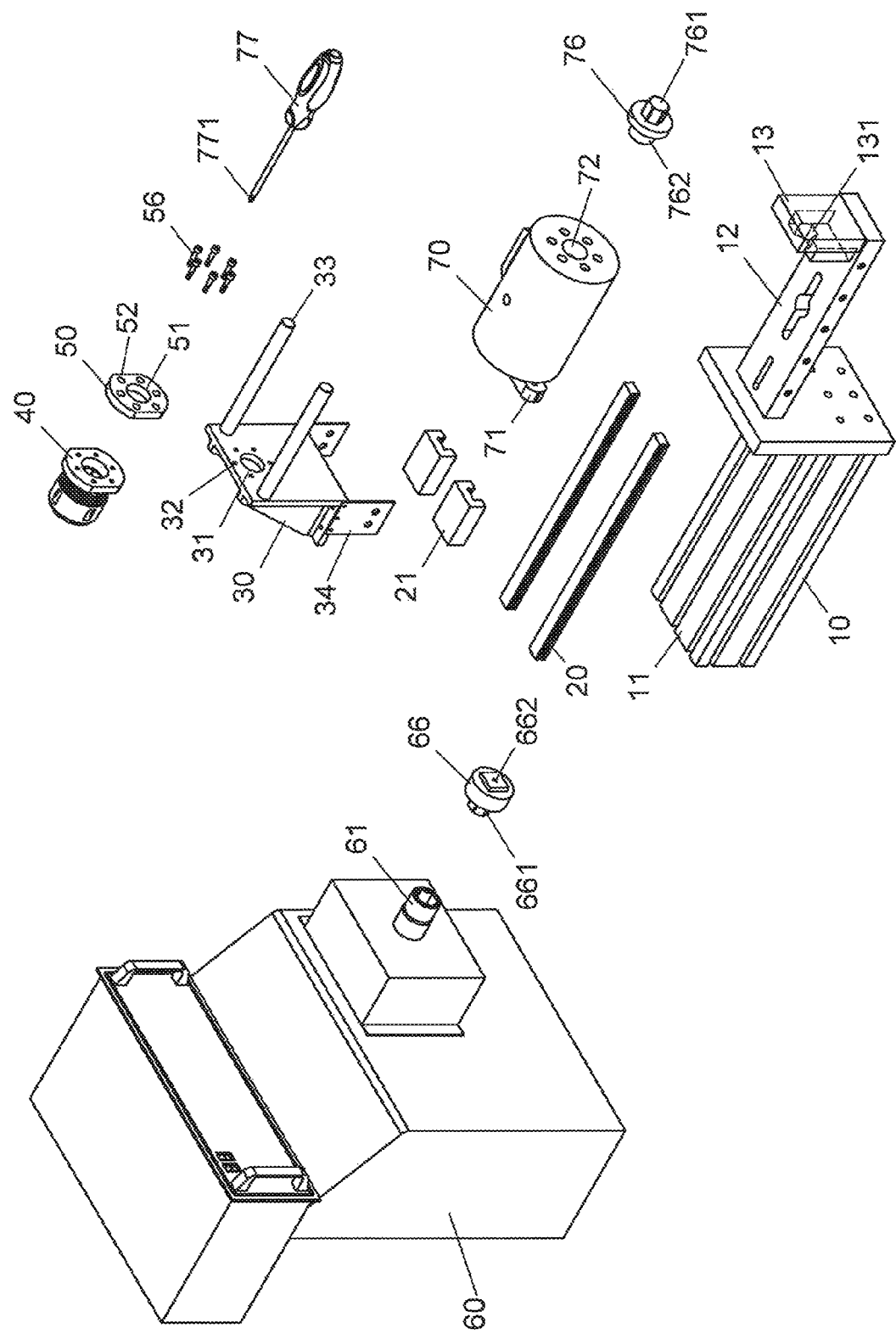
FIG. 1 is an exploded view of the torque detection device of the present invention.
Figure 2:
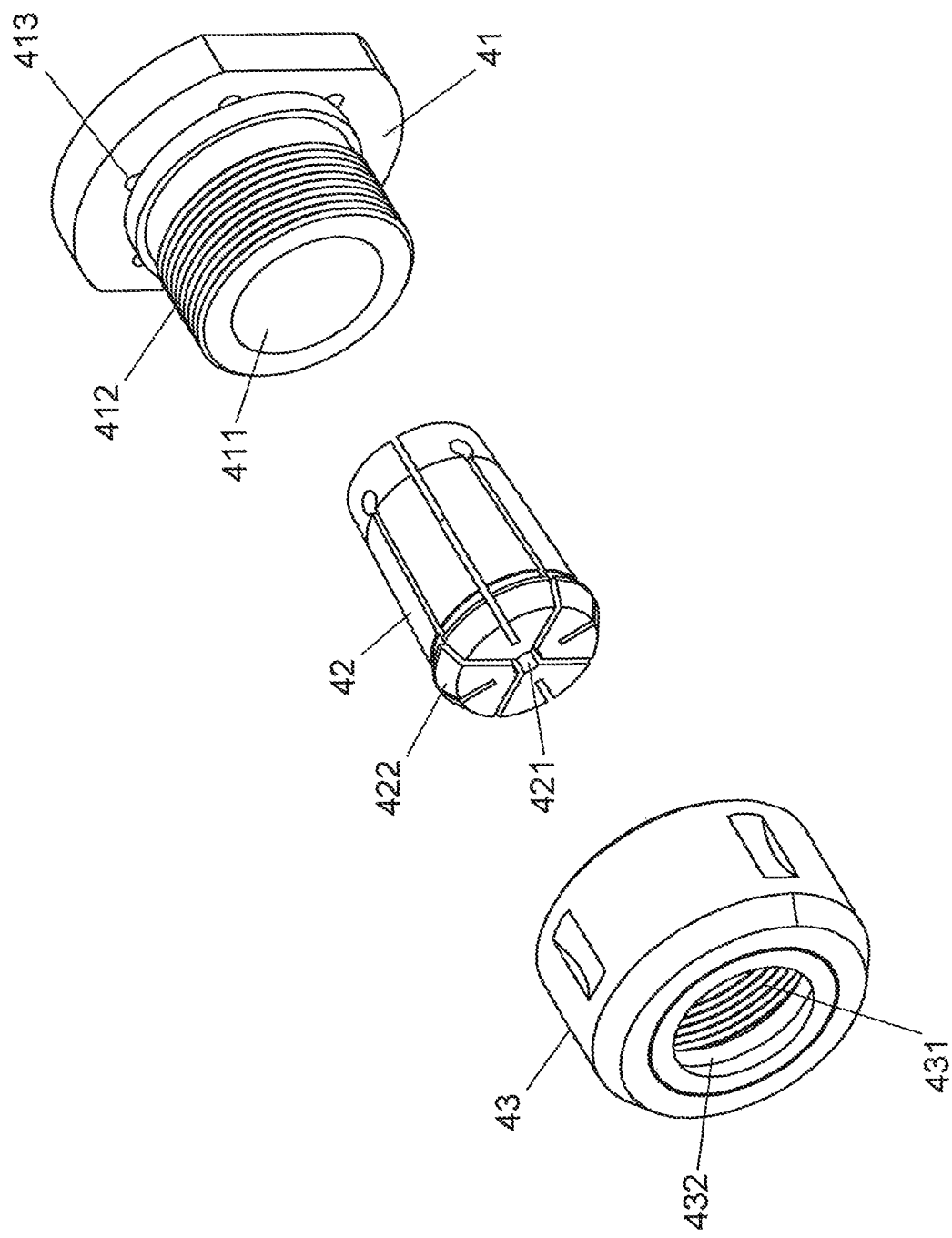
FIG. 2 is an exploded view of the chuck unit of the torque detection device of the present invention.
Figure 3:
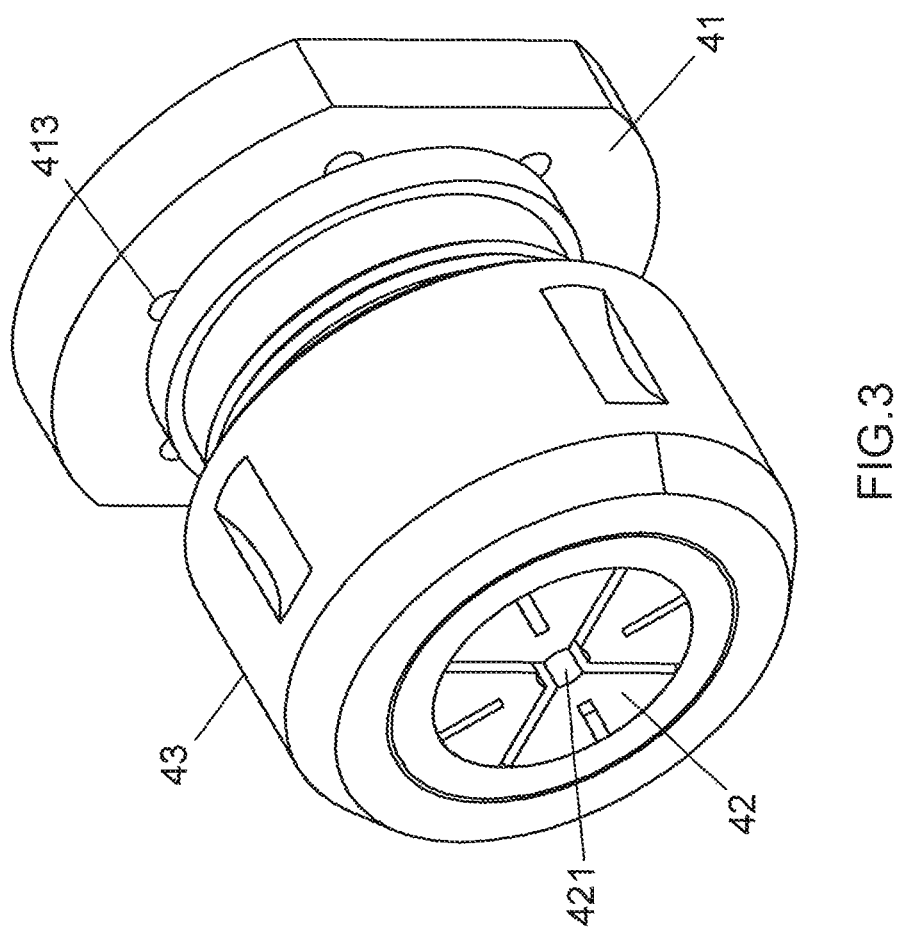
FIG. 3 is a perspective view to show the chuck unit of the torque detection device of the present invention.
Figure 5:
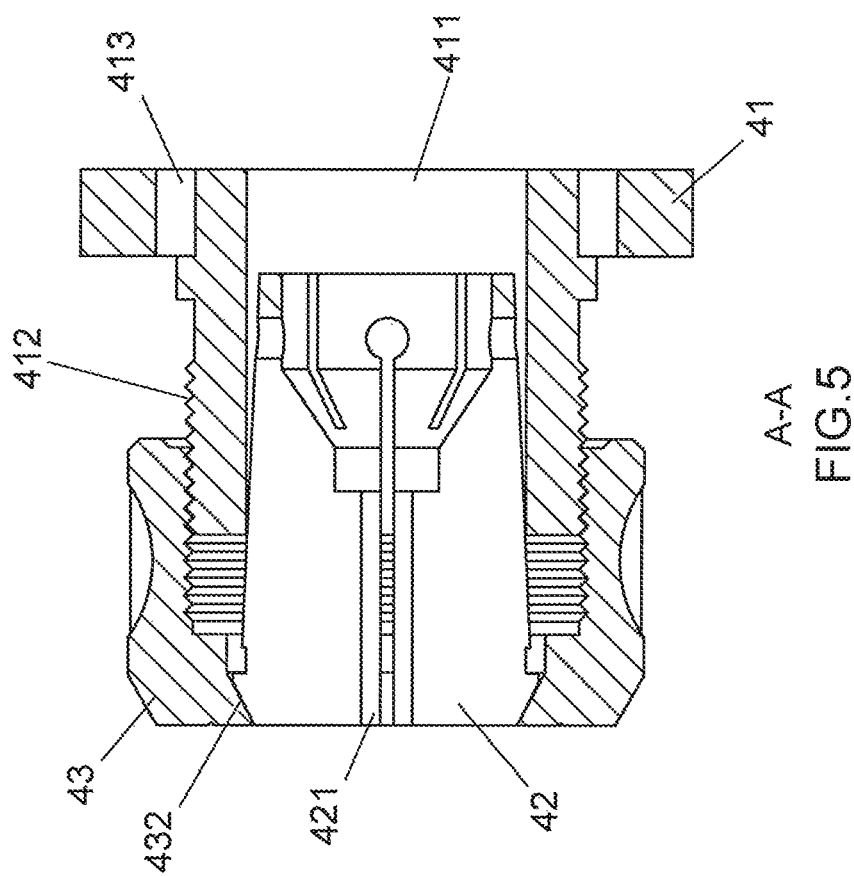
FIG. 5 is a cross sectional view, taken along line A-A in FIG. 4.
Figure 4:
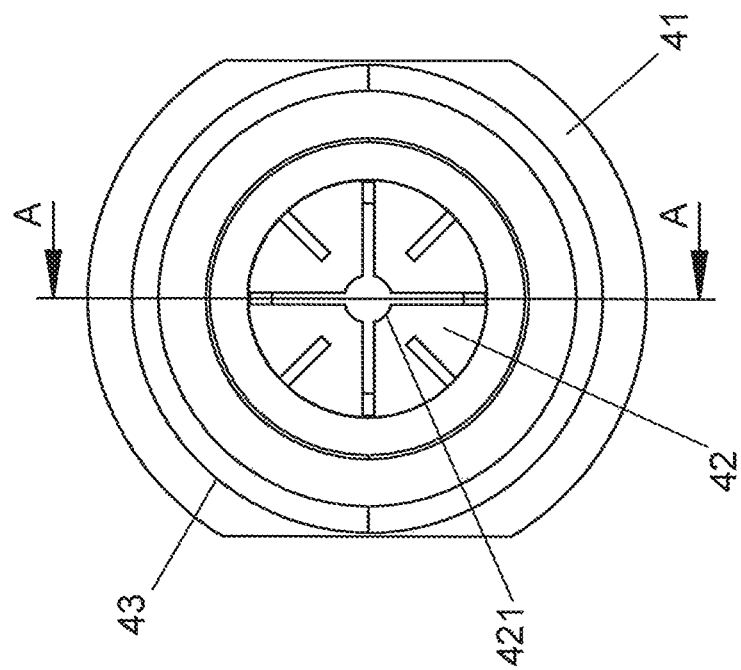
FIG. 4 is a front view of the chuck unit of the torque detection device of the present invention.
Figure 8:
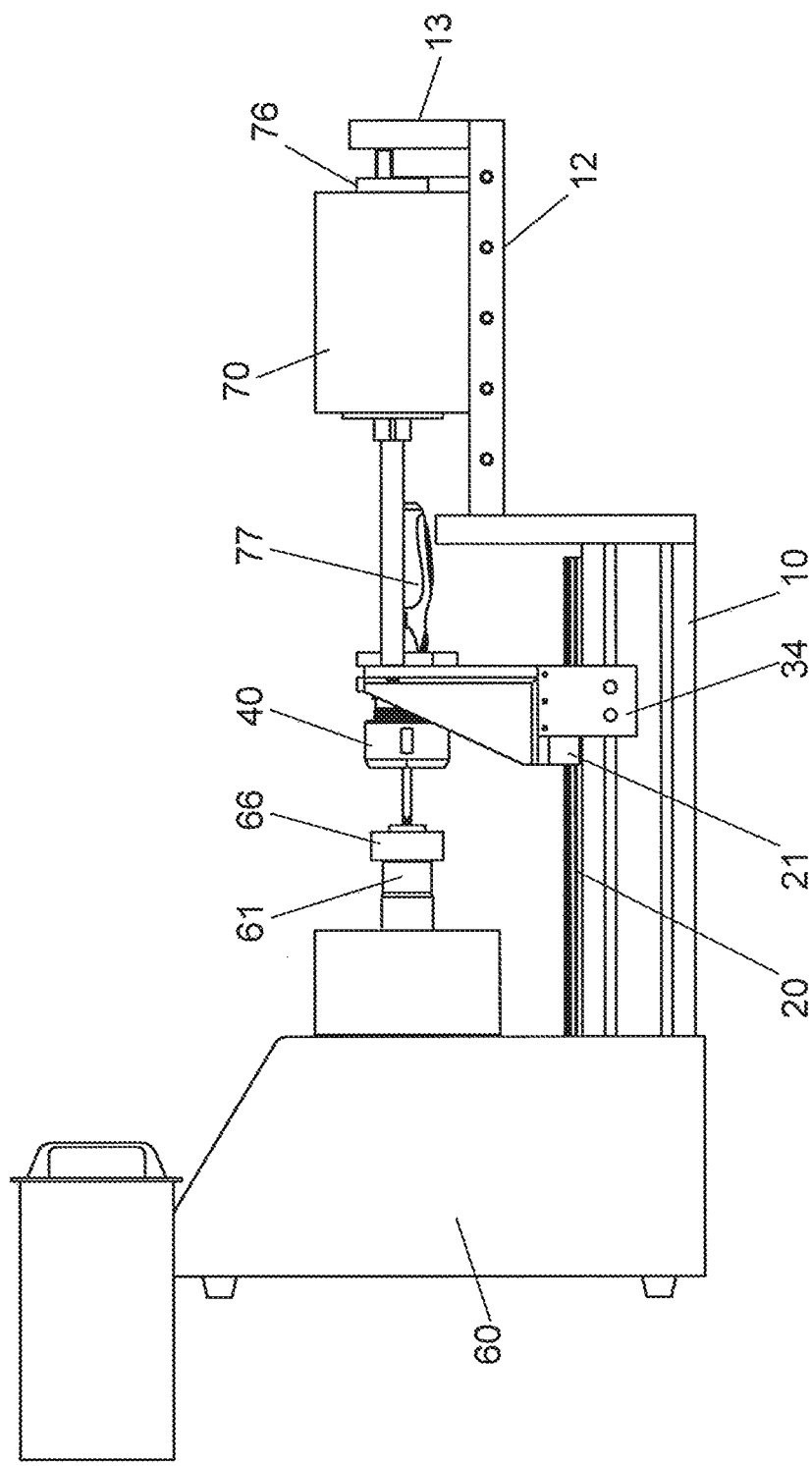
FIG. 8 is a side view of the torque detection device of the present invention.

Referring to FIGS. 1 to 8, the torque detection device of the present invention comprises a base 10 which has a first support portion 11, a second support portion 12 and a third support portion 13, wherein the third support portion 13 extends from the distal end of the second support portion 12, and the third support portion 13 has a U-shaped end board 131. Two first rails 20 are respectively connected on two sides of the first support portion 11, and two second rails 21 are respectively and movably connected to the two first rails 20. The second rails 21 each are an inverted U-shaped rail.

A movable part 30 has its underside fixed to the two second rails 21 and is movable with the second rails 21 relative to the first rails 20. The movable part 30 has a first pivotal portion 31 which is a circular hole. Multiple first connection portions 32 are located around the first pivotal portion 31, and each first connection portion 32 is a circular hole. The diameter of each of the first connection portions 32 is smaller than that of the first pivotal portion 31. Two rods 33 extend from one side of the movable part 30. The movable part 30 has a side plate 34 on each of two sides thereof, the two side plates 34 contact the two sides of the first support portion 11.

A chuck unit 40 is connected to the movable part 30 and has a chuck head 41, a chuck jaw unit 42 and a locking member 43. The chuck head 41 is a hollow cylindrical head and has a second pivotal portion 411 which is located alignment with the first pivotal portion 31 of the movable part 30. The second pivotal portion 411 is a circular passage and has a first threading portion 412 defined in the outside thereof. The chuck head 41 has multiple second connection portions 413 which are located in alignment with the first connection portions 32. The second connection portions 413 are threaded holes. The chuck jaw unit 42 is a cylindrical member and located in the second pivotal portion 411 of the chuck head 41. The chuck jaw unit 42 has a clamp area 421 defined in the center thereof. The clamp area 421 is a circular path. The chuck jaw unit 42 has a first contact portion 422 defined along the distal end thereof, and the first contact portion 422 is inclined relative to the axis of the chuck jaw unit 42 and exposed beyond the second pivotal portion 411. The locking member 43 has a central passage in which the chuck jaw unit 42 is received. The locking member 43 has a second threading portion 431 defined therein which is threadedly connected to the first threading portion 412 of the chuck head 41. The locking member 43 has a second contact portion 432 defined therein which is located on one end of the second threading portion 431. The second contact portion 432 contacts against the first contact portion 422. The second threading portion 431 is threadedly rotated along the first threading portion 412 to press the second contact portion 432 against the first contact portion 422 to adjust the clamp area 421. The locking member 43 has an anti-slip surface defined in the outside thereof. The chuck jaw unit 42 of the chuck unit 40 is received in the second pivotal portion 411, and the first contact portion 422 is exposed from the second pivotal portion 411.

A fixing plate 50 connects the chuck head 41 to the movable part 30. The fixing plate 50 is located between the movable part 30 and the chuck unit 40. The fixing plate 50 has a third pivotal portion 51 which is located in aligned with the first pivotal portion 31 of the movable part 30 and the second pivotal portion 411 of the chuck unit 40. The third pivotal portion 51 is a circular hole. The fixing plate 50 has multiple third connection portions 52 which are located in alignment with the first connection portions 32 of the movable part 30 and the second connection portions 413 of the chuck unit 40. The third connection portions 52 are circular holes and located around the axis of the third pivotal portion 51. The bolts 56 extend through the third connection portions 52, the first connection portions 32 of the movable part 30 and are threadedly connected to the second connection portions 413 of the chuck unit 40. The bolts 56 connect the chuck unit 40 and the locking member 50 to the movable part 30.

A torque device 60 is connected to the first support portion 11 of the base 10 and located away from the second support portion 12. The torque device 60 has a receiving member 61 which is a hexagonal recess. A display member for displaying the value of torque is cooperated with the torque device 60. A first part 66 is connected to the receiving member 61 of the torque device 60, and the first part 66 has a first engaging portion 661 and a second engaging portion 662 respectively located on two sides thereof. The first engaging portion 661 is a hexagonal protrusion which is engaged with the receiving member 61. The second engaging portion 662 of the first part 66 is a cross-shaped slot.

An axial force detector 70 is connected to the second support portion 12 of the base 10 and has a reception member 71 on the first end thereof. The rods 33 of the movable part 30 are engaged with the reception member 71. The axial force detector 70 detects the axial force applied by the rods 33 of the movable part 30 to the axial force detector 70. A first engaging slot 72 defined in the second end of the axial force detector 70. The first engaging slot 72 is located in alignment with the end board 131 and is a circular hole. A first tool 77 is located in the chuck unit 40 and extends through the third pivotal portion 51, the first pivotal portion 31 and the second pivotal portion 411, and is clamped in the clamp area 421 of the chuck head 41. The first tool 77 has a function end 771 which is engaged with the second engaging portion 662 of the first part 66. In this embodiment, the function end 771 of the first tool 77 is a Phillips head tip which is engaged with the second engaging portion 662.

A second part 76 is connected to the end board 131 and the first engaging slot 72 of the axial force detector 70. The second part 76 has a third engaging portion 761 and a fourth engaging portion 762 respectively extending from two sides thereof. The third engaging portion 761 is a hexagonal protrusion which is connected to the end board 131 of the third support portion 13, and the fourth engaging portion 762 is a cylindrical protrusion which is inserted into the first engaging slot 72.

As shown in FIGS. 9 and 10, the function end 771 is inserted into the second engaging portion 662, when the first tool 77 is connected to the chuck unit 40, the torque device 60 applies a torque to the function end 771, and the torque device 60 detects the torque that the first tool 77 receives.

As shown in FIGS. 11 and 12, when the second engaged portion 662 is rotated, the function end 771 of the first tool 77 is separated from the second engaging portion 662 in the direction shown by the arrow-head by the torque of the second engaging portion 662. The first tool 77 drives the chuck unit 40 and the movable part 30 to move toward the axial force detector 70. The axial force detector 70 detects the axial force when the function end 771 of the first tool 77 is separated from the second engaging portion 662. The axial force is the value of the load applied to the axial force detector 70.

Figure 13:
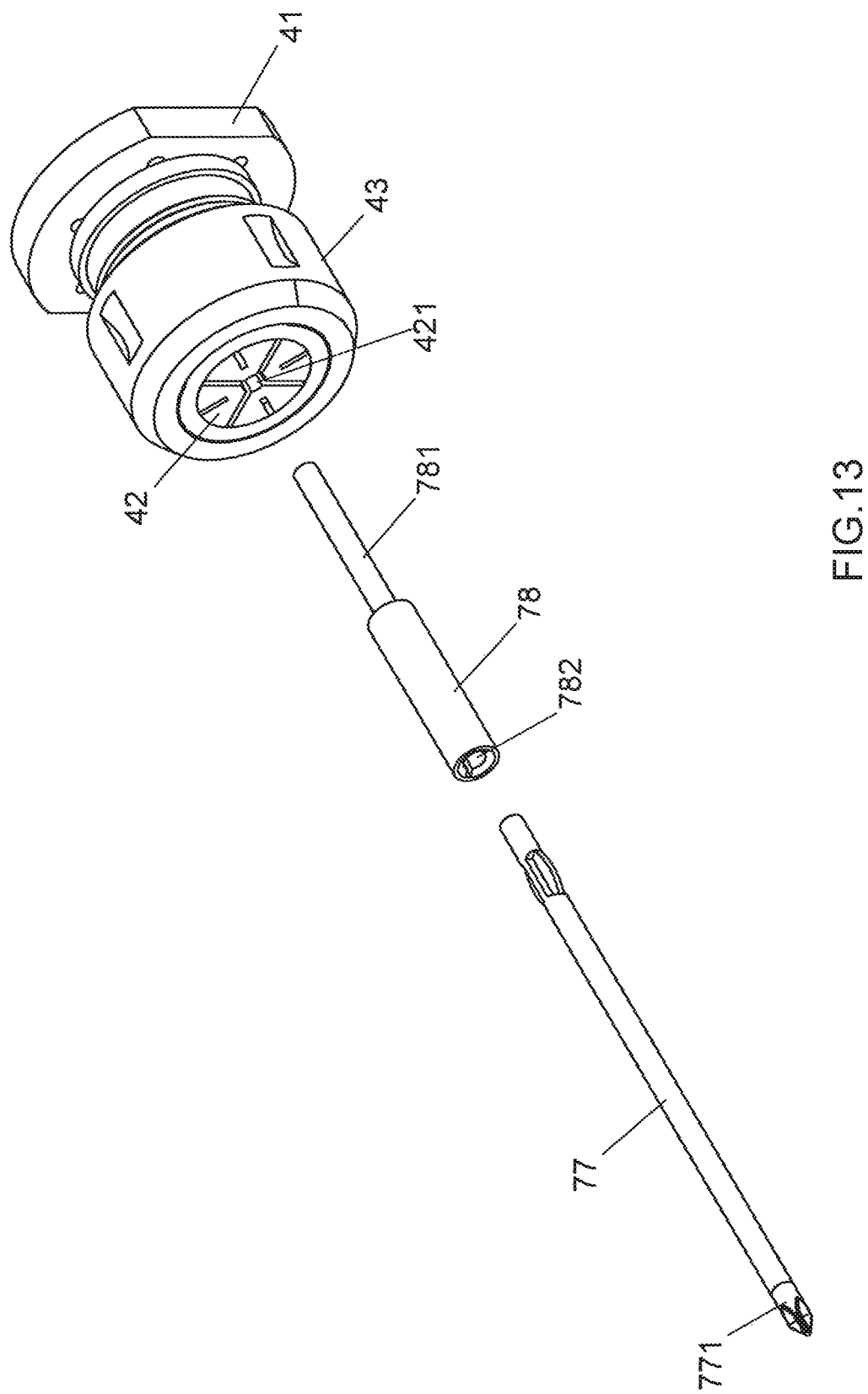
FIG. 13 is an exploded view of the chuck unit of the second embodiment of the torque detection device of the present invention.

As shown in FIG. 13, a third part 78 has a fifth engaging portion 781 and a sixth engaging portion 782 respectively located on two ends thereof. The fifth engaging portion 781 is a cylindrical rod and the sixth engaging portion 782 is a circular hole. The first tool 77 is inserted in the sixth engaging portion 782, and the function end 711 is exposed beyond the sixth engaging portion 782. The combination of the third part 78 and the first tool 77 is clamped in the clamp area 421 of the chuck unit 40.

Figure 14:
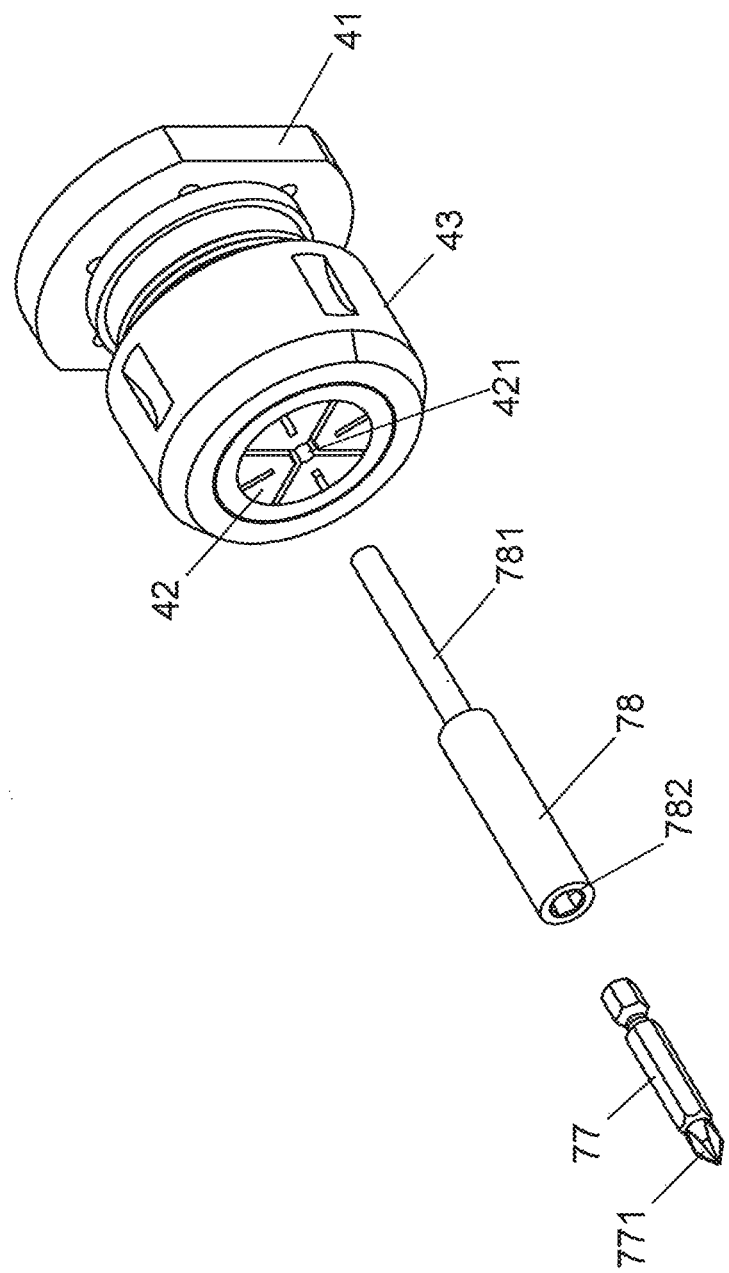
FIG. 14 is an exploded view of the chuck unit of the third embodiment of the torque detection device of the present invention.

As shown in FIG. 14*m* the first tool 77 is a screwdriver.

Figure 15:
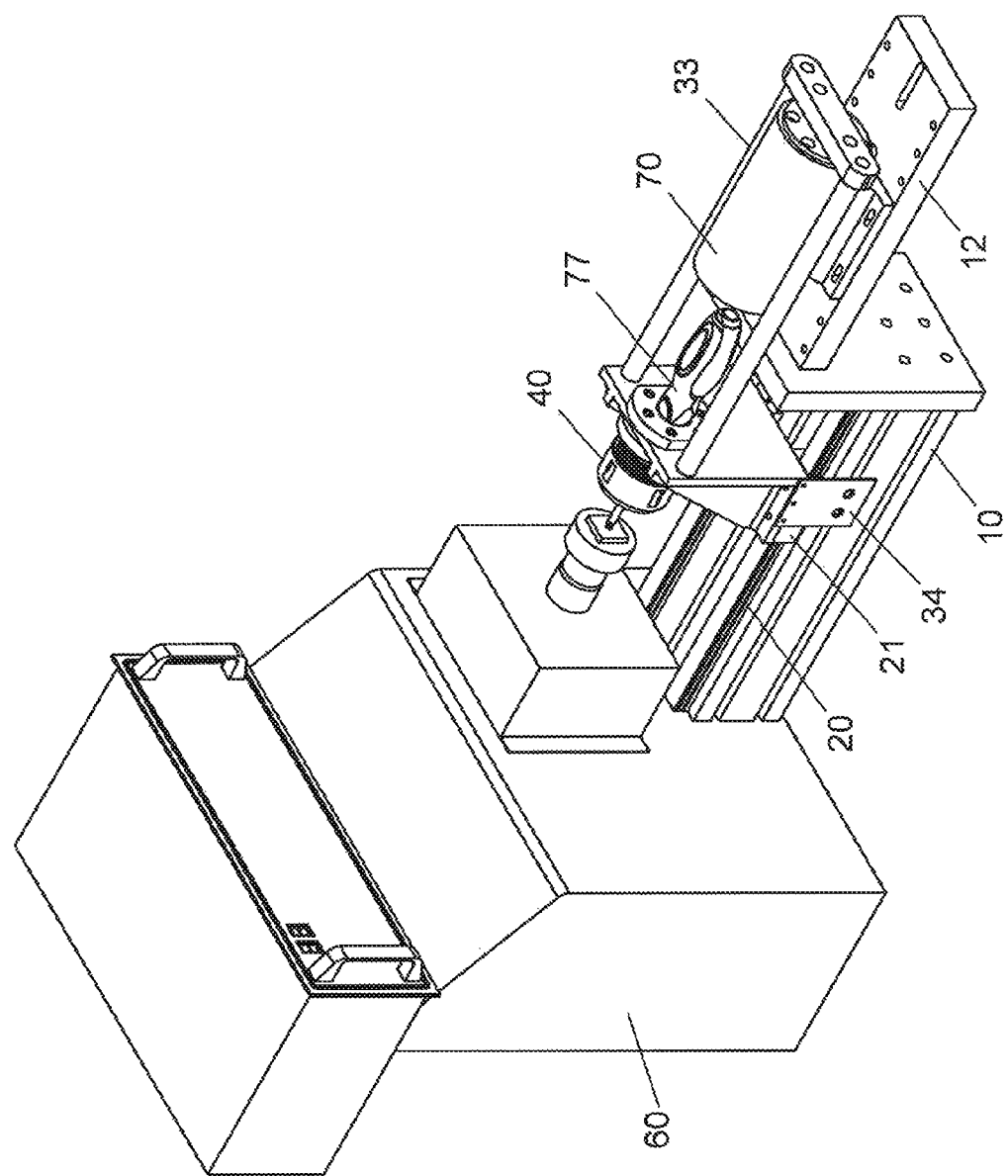
FIG. 15 is a perspective view of the fourth embodiment of the torque detection device of the present invention.
Figure 16:
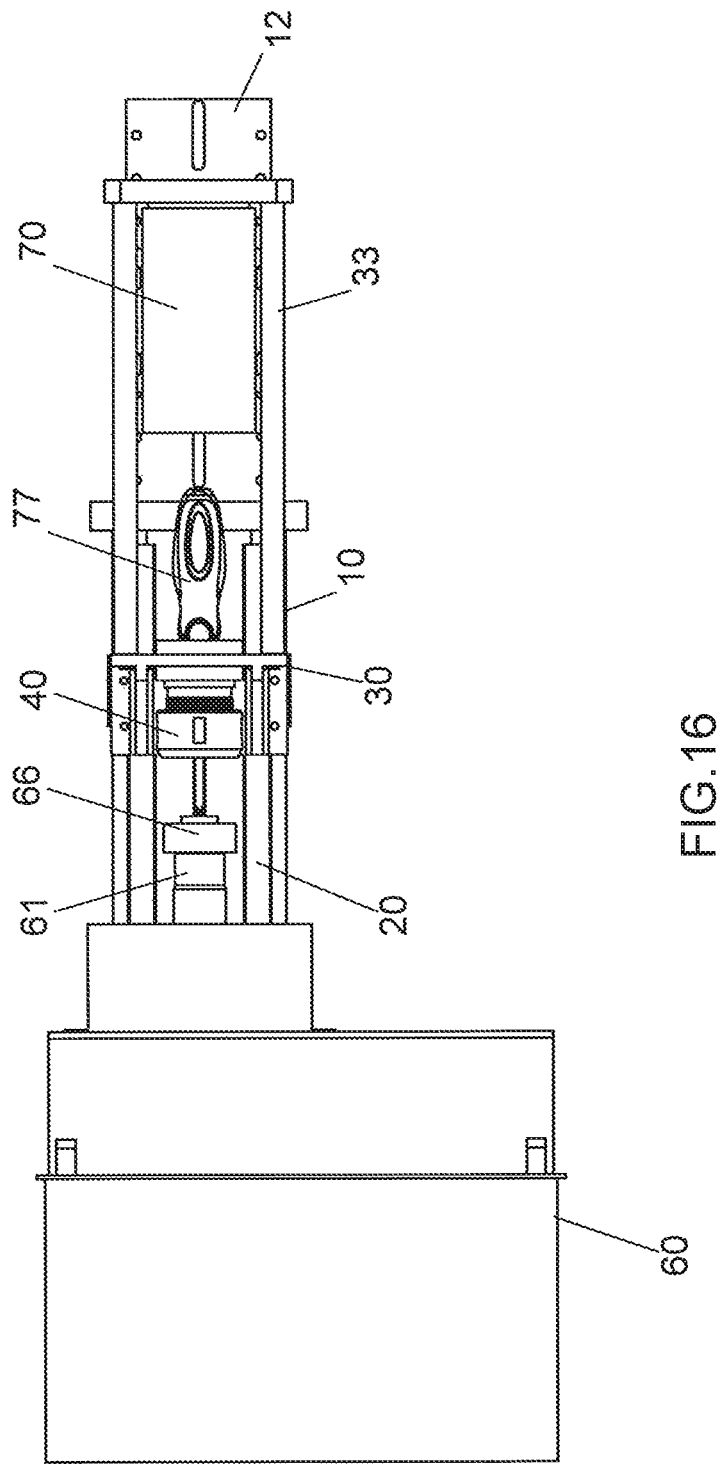
FIG. 16 is a top view of the fourth embodiment of the torque detection device of the present invention.

As shown in FIGS. 15 and 16, the embodiment without the third support portion 13 and the end board 131. The reception member 71 is connected to one end of the axial force detector 70. The rods 33 contact the reception member 71. The function end 771 of the first tool 77 is inserted into the second engaging portion 662, the second engaging portion 662 applies a torque to the first tool 77 which is then removed from the second engaging portion 662, the first tool 77 drives the chuck unit 40 and the movable part 30 to move toward the axial force detector 70, the axial force detector 70 detects an axial force when the function end 771 is separated from the second engaging portion 662. The axial force is the value of pull force of the axial force detector 70. Preferably, the receiving member 61 of the torque device 60, the first part 66, the first tool 77, the chuck unit 40, the rods 33 of the movable part 30 and the reception member 71 of the axial force detector 70 are located on the same plane. The axial force that detected by the axial force detector 70 will be more precise.

The way that the present invention operates is that the first tool 77 receives the torque from the second engaging portion 662, when the value of the torque reaches a pre-set value, the function end 771 of the first tool 77 is separated from the second engaging portion 662. When the first tool 77 is moved due to the torque, the first tool 77 drives the chuck unit 40 and the movable part 30 to move slightly toward the axial force detector 70 along the first rails 20. The axial force detector 70 detects the axial force when the function end 771 of the first tool 77 is separated from the second engaging portion 662. The axial force is the value of the load applied to the axial force detector 70. The present invention then detects the torque and the pull force.

In one embodiment, the base 10, the torque device 60 or a proper position of the torque device sets a video camera to record how the function end 711 of the first tool 77 is separated from the second engaging portion 662 of the first part 66. The recording data is stored in a data storage device.

The axial force detector 70 has a display member which displays a value of axial force.

When detecting the axial force again, there are two installations may be used to the axial force detector 70. The first is that the torque device may have the function of destruction test so as to detect the maximum axial force that can pull the function end 771 of the first tool 77 away from the second engaging portion 662 of the first part 66. The section way is that the torque device may have a fixed value of the torque to test the force that the function end 771 of the first tool 77 is pulled away from the second engaging portion 662 of the first part 66 under the fixed torque.

In one embodiment, a computer is installed to record the value of the load and the value of the pull force of the axial force detector 70, and the value of torque of the torque device 60. The computer has a software which analyzes the value of the load, the value of the pull force, and the value of the torque so as to form a curve. Multiple times of tests obtain different curves such that the relationship between different criteria can be obtained. These curves and the results of the analysis of the curves can be used to improve the design of the products.

In one embodiment, the axial force detector 70 has a display member which displays the value of the axial force detected by the axial force detector 70. Alternatively, the axial force detector 70 has no display member, and the value of the axial force detected by the axial force detector 70 is displayed on the display member of the torque device 60.

In one embodiment, the axial force detector 70 is a load cell.

In one embodiment, the first part 66 is integral with the receiving member 61.

While we have shown and described the embodiment in accordance with the present invention, it should be clear to those skilled in the art that further embodiments may be made without departing from the scope of the present invention.

What is claimed is:

1. A torque detection device comprising:
   a base having a first support portion and a second support portion;
   two first rails respectively connected on two sides of the first support portion;
   two second rails respectively and movably connected to the two first rails;
   a movable part having an underside thereof fixed to the two second rails and movable with the second rails relative to the first rails, the movable part having a first pivotal portion which is a circular hole, at least one rod extending from one side of the movable part;
   a chuck unit connected to the movable part and having a chuck head, a chuck jaw unit and a locking member, the chuck head being a hollow cylindrical head and having a second pivotal portion which is located alignment with the first pivotal portion of the movable part, the second pivotal portion being a circular passage and having a first threading portion defined in an outside thereof, the chuck jaw unit being a cylindrical member and located in the second pivotal portion of the chuck head, the chuck jaw unit having a clamp area defined in a center thereof, the clamp area being a circular path, the chuck jaw unit having a first contact portion defined along a distal end thereof, the first contact portion being inclined relative to an axis of the chuck jaw unit and exposed beyond the second pivotal portion, the locking member having a central passage in which the chuck jaw unit is received, the locking member having a second threading portion defined therein which is threadedly connected to the first threading portion of the chuck head, the locking member having a second contact portion defined therein which is located on one end of the second threading portion, the second contact portion contacting against the first contact portion to adjust the clamp area;
   a fixing plate connecting the chuck head to the movable part, the fixing plate located between the movable part and the chuck unit, the fixing plate having a third pivotal portion which is located in aligned with the first pivotal portion of the movable part and the second pivotal portion of the chuck unit, the third pivotal portion being a circular hole;
   a torque device connected to the first support portion of the base and located away from the second support portion, the torque device having a receiving member;
   a first part connected to the receiving member of the torque device, the first part having a first engaging portion and a second engaging portion respectively located on two sides thereof, the first engaging portion is engaged with the receiving member;
   an axial force detector connected to the second support portion of the base and having a reception member on a first end thereof, the at least one rod of the movable part engaged with the reception member, the axial force detector detecting axial force applied by the at least one rod of the movable part to the axial force detector, and
   a first tool located in the chuck unit and extending through the third pivotal portion, the first pivotal portion and the second pivotal portion, and being clamped in the clamp area of the chuck head, the first tool having a function end which is engaged with the second engaging portion of the first part.

2. The torque detection device as claimed in claim 1, wherein multiple first connection portions are located around the first pivotal portion, each first connection portion is a circular hole, a diameter of each of the first connection portions is smaller than that of the first pivotal portion, the chuck head has multiple second connection portions and located in alignment with the first connection portions, the second connection portions are threaded holes, multiple bolts extend through the first connection portions of the movable part and are threadedly connected to the second connection portions to connect the chuck unit to the movable part.

3. The torque detection device as claimed in claim 2, wherein the fixing plate has multiple third connection portions which are located in alignment with the first connection portions of the movable part and the second connection portions of the chuck unit, the third connection portions are circular holes and located around an axis of the third pivotal portion, the bolts extend through the third connection portions, the first connection portions of the movable part and are threadedly connected to the second connection portions of the chuck unit, the bolts connect the chuck unit and the locking member to the movable part.

4. The torque detection device as claimed in claim 1, wherein the locking member has an anti-slip surface defined in an outside thereof, the second rails are inverted U-shaped, the movable part has a side plate on each of two sides thereof, the two side plates contact the two sides of the first support portion.

5. The torque detection device as claimed in claim 1, wherein the base has a third support portion which extends from a distal end of the second support portion, the third support portion has a U-shaped end board, a first engaging slot defined in a second end of the axial force detector, the first engaging slot is located in alignment with the end board and is a circular hole, a second part is connected to the end board and the first engaging slot of the axial force detector, the second part has a third engaging portion and a fourth engaging portion respectively extending from two sides thereof, the third engaging portion is a hexagonal protrusion which is connected to the end board of the third support portion, the fourth engaging portion is a cylindrical protrusion which is inserted into the first engaging slot.

6. The torque detection device as claimed in claim 1, wherein there are two rods on the movable part.

7. The torque detection device as claimed in claim 1, wherein the receiving member is a hexagonal recess and the first engaging portion is a hexagonal protrusion.

8. The torque detection device as claimed in claim 1, wherein the torque device has a display member for displaying a value of torque, a video camera is set to record how the function end of the first tool is separated from the second engaging portion of the first part, a recording data is stored in a data storage device, the axial force detector has a display member which displays a value of axial force.

9. The torque detection device as claimed in claim 1, wherein the second engaging portion of the first part is a cross-shaped slot, the function end of the first tool is a Phillips head tip which is engaged with the second engaging portion.

10. The torque detection device as claimed in claim 1, wherein a third part has a fifth engaging portion and a sixth engaging portion respectively located on two ends thereof, the fifth engaging portion is a cylindrical rod and the sixth engaging portion is a circular hole, the first tool is inserted in the sixth engaging portion and the function end is exposed beyond the sixth engaging portion, the combination of the third part and the first tool is clamped in the clamp area of the chuck unit.

11. The torque detection device as claimed in claim 1, wherein when the function end of the first tool is inserted into the second engaging portion, the second engaging portion applies a torque to the first tool which is then removed from the second engaging portion, the first tool drives the chuck unit and the movable part to move toward the axial force detector, the axial force detector detects an axial force when the function end is separated from the second engaging portion, the axial force is the is a value of pull force of the axial force detector.

12. The torque detection device as claimed in claim 1, wherein a computer records a value of a load and a value of pull force of the axial force detector, and a value of torque of the torque device, the computer has a software which analyzes the value of the load, the value of the pull force, and the value of the torque so as to form a curve.

13. The torque detection device as claimed in claim 1, wherein the axial force detector is a load cell.

14. The torque detection device as claimed in claim 1, wherein the first part is integral with the receiving member.

* * * * *